(12) United States Patent
Zhao et al.

(10) Patent No.: US 8,773,377 B2
(45) Date of Patent: Jul. 8, 2014

(54) MULTI-PASS TOUCH CONTACT TRACKING

(75) Inventors: Weidong Zhao, Redmond, WA (US); David A. Stevens, Sammamish, WA (US); Aleksandar Uzelac, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 13/156,243

(22) Filed: Jun. 8, 2011

(65) Prior Publication Data

US 2012/0223894 A1    Sep. 6, 2012

Related U.S. Application Data

(60) Provisional application No. 61/449,538, filed on Mar. 4, 2011.

(51) Int. Cl.
*G06F 3/041* (2006.01)

(52) U.S. Cl.
USPC ........................................................ 345/173

(58) Field of Classification Search
USPC ........................................................ 345/173
See application file for complete search history.

(56) References Cited

U.S. PATENT DOCUMENTS

| | | | |
|---|---|---|---|
| 4,421,997 A | 12/1983 | Forys | |
| 5,825,352 A | 10/1998 | Bisset et al. | |
| 5,856,822 A | 1/1999 | Du et al. | |
| 5,943,043 A | 8/1999 | Furuhata et al. | |
| 6,008,636 A | 12/1999 | Miller et al. | |
| 6,091,406 A | 7/2000 | Kambara et al. | |
| 6,323,846 B1 | 11/2001 | Westerman et al. | |
| 6,671,406 B1 | 12/2003 | Anderson | |
| 6,741,237 B1 | 5/2004 | Benard et al. | |
| 6,856,259 B1 | 2/2005 | Sharp | |
| 6,977,646 B1 | 12/2005 | Hauck et al. | |
| 7,053,887 B2 | 5/2006 | Kraus et al. | |
| 7,174,649 B1 | 2/2007 | Harris | |

(Continued)

FOREIGN PATENT DOCUMENTS

| | | |
|---|---|---|
| CN | 1761932 | 4/2006 |
| CN | 200947594 | 9/2007 |

(Continued)

OTHER PUBLICATIONS

"Actuation Force of Touch Screen", Solutions @ Mecmesin, retrieved from <http://www.ArticleOnePartners.com/index/servefile?fileId=188971>,(Dec. 31, 2010), 1 page.

(Continued)

*Primary Examiner* — Charles V Hicks
(74) *Attorney, Agent, or Firm* — Tony Azure; Andrews Sanders; Micky Minhas

(57) ABSTRACT

In embodiments of multi-pass touch contact tracking, touch input sensor data is recognized as a series of components of a contact on a touch-screen display. The components can be determined to correlate to the contact based on multi-pass nearest-neighbor contact mapping that includes forward nearest-neighbor contact mapping of the components and reverse nearest-neighbor contact mapping of the components. The components can then be associated to represent a tracking of the contact. Subsequent components of the contact can also be determined and associated with the previous components of the contact to further represent the tracking of the contact.

20 Claims, 8 Drawing Sheets

(56) References Cited

U.S. PATENT DOCUMENTS

| | | |
|---|---|---|
| 7,254,775 B2 | 8/2007 | Geaghan et al. |
| 7,295,191 B2 | 11/2007 | Kraus et al. |
| 7,362,313 B2 | 4/2008 | Geaghan et al. |
| 7,375,454 B2 | 5/2008 | Takasaki |
| 7,580,556 B2 | 8/2009 | Lee et al. |
| 7,592,999 B2 | 9/2009 | Rosenberg et al. |
| 7,619,618 B2 | 11/2009 | Westerman et al. |
| 7,711,450 B2 | 5/2010 | Im et al. |
| 7,725,014 B2 | 5/2010 | Lam et al. |
| 7,728,821 B2 | 6/2010 | Hillis et al. |
| 7,746,325 B2 | 6/2010 | Roberts |
| 7,797,115 B2 | 9/2010 | Tasher et al. |
| 7,812,828 B2 | 10/2010 | Westerman et al. |
| 7,907,750 B2 | 3/2011 | Ariyur et al. |
| 7,938,009 B2 | 5/2011 | Grant et al. |
| 7,978,182 B2 | 7/2011 | Ording et al. |
| 8,061,223 B2 | 11/2011 | Pan |
| 8,217,909 B2 | 7/2012 | Young |
| 8,314,780 B2 | 11/2012 | Lin et al. |
| 8,493,355 B2 | 7/2013 | Geaghan et al. |
| 2003/0164820 A1 | 9/2003 | Kent |
| 2004/0207606 A1 | 10/2004 | Atwood et al. |
| 2005/0012724 A1 | 1/2005 | Kent |
| 2005/0063566 A1 | 3/2005 | Beek et al. |
| 2006/0097991 A1 | 5/2006 | Hotelling et al. |
| 2006/0175485 A1 | 8/2006 | Cramer |
| 2007/0081726 A1 | 4/2007 | Westerman et al. |
| 2008/0041639 A1* | 2/2008 | Westerman et al. ....... 178/18.01 |
| 2008/0062140 A1 | 3/2008 | Hotelling et al. |
| 2008/0068229 A1 | 3/2008 | Chuang |
| 2008/0150909 A1 | 6/2008 | North et al. |
| 2008/0158185 A1 | 7/2008 | Westerman |
| 2008/0180399 A1 | 7/2008 | Cheng |
| 2008/0211778 A1 | 9/2008 | Ording et al. |
| 2008/0211782 A1 | 9/2008 | Geaghan et al. |
| 2008/0278453 A1 | 11/2008 | Reynolds et al. |
| 2008/0284899 A1 | 11/2008 | Haubmann et al. |
| 2008/0309624 A1 | 12/2008 | Hotelling |
| 2008/0309629 A1 | 12/2008 | Westerman et al. |
| 2009/0009483 A1 | 1/2009 | Hotelling et al. |
| 2009/0046073 A1 | 2/2009 | Pennington et al. |
| 2009/0096753 A1 | 4/2009 | Lim |
| 2009/0141046 A1 | 6/2009 | Rathnam et al. |
| 2009/0157206 A1 | 6/2009 | Weinberg et al. |
| 2009/0160763 A1 | 6/2009 | Cauwels et al. |
| 2009/0174679 A1 | 7/2009 | Westerman |
| 2009/0225036 A1 | 9/2009 | Wright |
| 2009/0241701 A1 | 10/2009 | Pan |
| 2009/0250268 A1 | 10/2009 | Staton et al. |
| 2009/0251435 A1 | 10/2009 | Westerman et al. |
| 2009/0251436 A1 | 10/2009 | Keskin |
| 2009/0267903 A1 | 10/2009 | Cady et al. |
| 2009/0273584 A1 | 11/2009 | Staton et al. |
| 2009/0303202 A1 | 12/2009 | Liu |
| 2009/0312009 A1 | 12/2009 | Fishel |
| 2010/0053099 A1 | 3/2010 | Vincent et al. |
| 2010/0073318 A1 | 3/2010 | Hu et al. |
| 2010/0103118 A1 | 4/2010 | Townsend et al. |
| 2010/0103121 A1 | 4/2010 | Kim et al. |
| 2010/0134429 A1 | 6/2010 | You et al. |
| 2010/0193258 A1 | 8/2010 | Simmons et al. |
| 2010/0214233 A1 | 8/2010 | Lee |
| 2010/0231508 A1 | 9/2010 | Cruz-Hernandez et al. |
| 2010/0277505 A1 | 11/2010 | Ludden et al. |
| 2010/0302211 A1 | 12/2010 | Huang |
| 2010/0309139 A1 | 12/2010 | Ng |
| 2010/0315266 A1 | 12/2010 | Gunawardana et al. |
| 2010/0315366 A1 | 12/2010 | Lee et al. |
| 2010/0315372 A1 | 12/2010 | Ng |
| 2011/0018822 A1 | 1/2011 | Lin et al. |
| 2011/0025629 A1 | 2/2011 | Grivna et al. |
| 2011/0042126 A1 | 2/2011 | Spaid et al. |
| 2011/0050620 A1 | 3/2011 | Hristov |
| 2011/0080348 A1 | 4/2011 | Lin et al. |
| 2011/0084929 A1 | 4/2011 | Chang et al. |
| 2011/0106477 A1 | 5/2011 | Brunner |
| 2011/0115709 A1 | 5/2011 | Cruz-Hernandez |
| 2011/0141054 A1 | 6/2011 | Wu |
| 2011/0261005 A1 | 10/2011 | Joharapurkar et al. |
| 2011/0267481 A1 | 11/2011 | Kagei |
| 2011/0298709 A1 | 12/2011 | Vaganov |
| 2011/0298745 A1 | 12/2011 | Souchkov |
| 2011/0299734 A1 | 12/2011 | Bodenmueller |
| 2011/0304577 A1 | 12/2011 | Brown |
| 2011/0304590 A1 | 12/2011 | Su et al. |
| 2012/0030624 A1 | 2/2012 | Migos |
| 2012/0032891 A1 | 2/2012 | Parivar |
| 2012/0065779 A1 | 3/2012 | Yamaguchi et al. |
| 2012/0068957 A1 | 3/2012 | Puskarich et al. |
| 2012/0075331 A1 | 3/2012 | Mallick |
| 2012/0105334 A1 | 5/2012 | Aumiller et al. |
| 2012/0131490 A1 | 5/2012 | Lin et al. |
| 2012/0146956 A1 | 6/2012 | Jenkinson |
| 2012/0187956 A1 | 7/2012 | Uzelac |
| 2012/0188176 A1 | 7/2012 | Uzelac |
| 2012/0188197 A1 | 7/2012 | Uzelac |
| 2012/0191394 A1 | 7/2012 | Uzelac |
| 2012/0206377 A1 | 8/2012 | Zhao |
| 2012/0206380 A1 | 8/2012 | Zhao |
| 2012/0268416 A1 | 10/2012 | Pirogov et al. |
| 2012/0280934 A1 | 11/2012 | Ha et al. |
| 2012/0319992 A1 | 12/2012 | Lee |
| 2013/0016045 A1 | 1/2013 | Zhao |
| 2013/0063167 A1 | 3/2013 | Jonsson |
| 2013/0113751 A1 | 5/2013 | Uzelac |
| 2013/0197862 A1 | 8/2013 | Uzelac et al. |
| 2013/0238129 A1 | 9/2013 | Rose et al. |
| 2013/0345864 A1 | 12/2013 | Park |

FOREIGN PATENT DOCUMENTS

| | | |
|---|---|---|
| CN | 101553777 | 10/2009 |
| CN | 101661373 | 3/2010 |
| CN | 101937296 | 1/2011 |
| CN | 201828476 | 5/2011 |
| CN | 2201903594 | 7/2011 |
| CN | 202093112 | 12/2011 |
| CN | 101545938 | 1/2012 |
| CN | 202171626 | 3/2012 |
| CN | 202196126 | 4/2012 |
| CN | 102436334 | 5/2012 |
| CN | 101982783 | 7/2012 |
| DE | 19939159 A1 | 3/2000 |
| EP | 2284654 | 2/2011 |
| JP | 2003303051 | 10/2003 |
| KR | 1020050003155 A | 1/2005 |
| KR | 20050094359 | 9/2005 |
| KR | 100763057 | 10/2007 |
| KR | 1020080066416 A | 7/2008 |
| KR | 100941441 | 2/2010 |
| KR | 20100067178 | 6/2010 |
| KR | 20100077298 | 7/2010 |
| KR | 20100129015 | 12/2010 |
| KR | 101007049 | 1/2011 |
| KR | 1020110011337 A | 2/2011 |
| KR | 101065014 | 9/2011 |
| WO | WO-2006042309 | 4/2006 |
| WO | WO-2010073329 | 7/2010 |
| WO | WO-2013063042 | 5/2013 |

OTHER PUBLICATIONS

"AO Touch Screen Tester", retrieved from <http://www.ao-cs.com/Projects/touch%20screen%20tester%20project.html>, (Dec. 31, 2010), 1 page.

"Capacitive Touch Sensors—Application Fields, Technology Overview and Implementation Example", *Fujitsu Microelectronics Europe GmbH*; retrieved from http://www.fujitsu.com/downloads/MICRO/fme/articles/fujitsu-whitepaper-capacitive-touch-sensors.pdf on Jul. 20, 2011, (Jan. 12, 2010),12 pages.

"Haptic-Actuator Controllers", retrieved from <http://www.maxim-ic.com/products/data_converters/touch-interface/haptic-actuator.cfm> on May 4, 2011, 1 page.

(56) References Cited

OTHER PUBLICATIONS

"How to Use the Precision Touch Testing Tool", retrieved from <http://feishare.com/attachments/article/279/precision-touch-testind-tool-Windows8-hardware-certification.pdf>, (Apr. 15, 2012),10 pages.

"Linearity Testing Solutions in Touch Panels", retrieved from <advantech.com/machine-automation/ . . . /(%7BD05BC586-74DD-4BFA-B81A-2A9F7ED489F/>, (Nov. 15, 2011), 2 pages.

"MAX11871", retrieved from <http://www.maxim-ic.com/datasheet/index.mvp/id/7203> on May 4, 2011, 2 pages.

"MicroNav Integration Guide Version 3.0", retrieved from <http://www.steadlands.com/data/interlink/micronavintguide.pdf>, (Dec. 31, 2003),11 pages.

"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.

"OptoFidelity Touch & Test", retrieved from <http://www.ArticleOnePartners.com/index/servefile?fileId=188969, (Feb. 20, 2012), 2 pages.

"OptoFidelity Touch and Test", retrieved from <http://www.ArticleOnePartners.com/index/servefile?fileId=188420>, (May 4, 2012), 2 pages.

"OptoFidelity Two Fingers—robot", video available at <http://www.youtube.com/watch?v=YppRASbXHfk&feature=player_embedded#!section>, (Sep. 15, 2010), 2 pages.

PCT Search Report and Written Opinion, Application No. PCT/US2012/024781, (Sep. 3, 2012), 9 pages.

"Projected Capacitive Test Fixture", retrieved from <http://www.touch-intl.com/downloads/DataSheets%20for%20Web/6500443-PCT-DataSheet-Web.pdf>, (2009), 2 pages.

"Resistive Touch Screen_Resistance Linearity Test", video available at <http://www.youtube.com/watch?v=hb23GpQdXXU>, (Jun. 17, 2008), 2 pages.

"Smartphone Automatic Testing Robot at UEI Booth", video available at <http://www.youtube.com/watch?v=f-Q4ns-b9sA>, (May 9, 2012), 2 pages.

"STM23S-2AN NEMA 23 Integrated Drive+Motor", Retrieved from: <http://www.applied-motion.com/products/integrated-steppers/stm23s-2an> on Jan. 24, 2012, 3 pages.

"Technology Comparison: Surface Acoustic Wave, Optical and Bending Wave Technology", *3M Touch Systems*, Available at >http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>,(2009), pp. 1-4.

"Touch Panel Inspection & Testing Solution", retrieved from <http://www.ArticleOnePartners.com/index/servefile?fileId=188967 , (Dec. 31, 2010),1 page.

"Touch Panel Semi-Auto Handler Model 3810", retrieved from <http://www.chromaus.com/datasheet/3810_en.pdf>, (Dec. 31, 2010), 2 pages.

"TouchSense Systems Immersion", retrieved from http://www.ArticleOnePartners.com/index/servefile?fileId=188486>, (Jun. 19, 2010), 20 pages.

"Using Low Power Mode on the MPR083 and MPR084", *Freescale Semiconductor Application Note*, Available at <http://cache.freescale.com/files/sensors/doc/app_note/AN3583.pdf>, (Nov. 2007), pp. 1-5.

Asif, Muhammad et al., "MPEG-7 Motion Descriptor Extraction for Panning Camera Using Sprite Generated", *In Proceedings of AVSS 2008*, Available at <http://www.ieeexplore.ieee.org/stamp/stamp.jsp?tp=&arnumber=4730384>, (Sep. 2008), pp. 60-66.

Brodkin, Jon "Windows 8 hardware: Touchscreens, sensor support and robotic fingers", <<http://arstechnica.com/business/news/2011/09/windows-8-hardware-touch-screens-sensor-support-and-robotic-fingers.ars>>, (Sep. 13, 2011),1 Page.

Buffet,Y "Robot Touchscreen Analysis", <<http://ybuffet.posterous.com/labsmotocom-blog-archive-robot-touchscreen-an>>, (Apr. 19, 2010), 2 Pages.

Cravotta, Robert "The Battle for Multi-touch", *Embedded Insights*, retrieved from <http://www.embeddedinsights.com/channels/2011/04/12/the-battle-for-multi-touch/> on May 4, 2011,(Apr. 12, 2011), 3 pages.

Dillow, Clay "Liquid-Filled Robot Finger More Sensitive to Touch Than a Human's", retrieved from <www.popsci.com/technology/article/2012-06/new-robot-finger-more-sensitive-touch-human> on Jul. 27, 2012, (Jun. 19, 2012), 3 pages.

Hoggan, Eve et al., "Mobile Multi-Actuator Tactile Displays", *In 2nd international conference on Haptic and audio interaction design*, retrieved from <http://www.dcs.gla.ac.uk/~stephen/papers/HAID2.pdf>, (Oct. 29, 2007),12 pages.

Hoshino, et al., "Pinching at finger tips for humanoid robot hand", Retrieved at <<http://web.mit.edu/zoz/Public/HoshinoKawabuchiRobotHand.pdf>>, (Jun. 30, 2005), 9 Pages.

Kastelan, et al., "Stimulation Board for Automated Verification of Touchscreen-Based Devices", *22nd International Conference on Field Programmable Logic and Applications*, Available at <https://www2.lirmm.fr/lirmm/interne/BIBLI/CDROM/MIC/2012/FPL_2012/Papers/PHD7.pdf>,(Aug. 29, 2012), 2 pages.

Kastelan, et al., "Touch-Screen Stimulation for Automated Verification of Touchscreen-Based Devices", *In IEEE 19th International Conference and Workshops on Engineering of Computer Based Systems*, (Apr. 11, 2012), pp. 52-55.

Khandkar, Shahedul H., et al., "Tool Support for Testing Complex MultiTouch Gestures", *ITS 2010*, Nov. 7-10, 2010, Saarbrucken, Germany, (Nov. 7, 2010), 10 pages.

Kjellgren, Olof "Developing a remote control application for Windows CE", *Bachelor Thesis performed in Computer Engineering at ABE Robotics, Miilardalen University, Department of Computer Science and Electronics*, Retrieved at <<http://www.idt.mdh.se/utbildning/exjobblfiles/TR0661.pdf>>,(May 30, 2007), 43 Pages.

Kuosmanen, Hans "OptoFidelity Automating UI Testing", video available at <http://youtube.com/watch?v=mOZ2r7ZvyTg&feature=player_embedded#!section>, (Oct. 14, 2010), 2 pages.

Kuosmanen, Hans "Testing the Performance of Touch-Enabled Smartphone User Interfaces", retrieved from <http://www.ArticleOnePartners.com/index/servefile?fileId=188442>, (Dec. 31, 2008), 2 pages.

Levin, Michael et al., "Tactile-Feedback Solutions for an Enhanced User Experience", retrieved from >http://www.pbinterfaces.com/documents/Tactile_Feedback_Solutions.pdf>, (Oct. 31, 2009), pp. 18-21.

McGlaun, Shane "Microsoft's Surface 2.0 Stress Testing Robot Called Patty Shown off for First Time", Retrieved at <<http://www_.slashgear._com/microsofts-surface-2_-0-stress-testing-robot_-called-patty-shown-off_-for_-first-time-19172971/>>, (Aug. 19, 2011), 1 Page.

McMahan, William et al., "Haptic Display of Realistic Tool Contact via Dynamically Compensated Control of a Dedicated Actuator", *International Conference on Intelligent Robots and Systems*, St. Louis, MO, Oct. 11-15, 2009, retrieved from <http://repository.upenn.edu/meam_papers/222>,(Dec. 15, 2009), 9 pages.

Pratt, Susan "Factors Affecting Sensor Response", *Analog Devices, AN-830 Application Note*, Available at <http://www.analog.com/static/imported-files/application_notes/5295737729138218742AN830_0.pdf>,(Dec. 2005), pp. 1-8.

Takeuchi, et al., "Development of a Muti-fingered Robot Hand with Softness changeable Skin Mechanism", *International Symposium on and 2010 6th German Conference on Robotics (ROBOTIK)*, Retrieved at <<http://ieeexplore.ieee.org/stamp/stamp.jsp?arnumber=05756853>>,(Jun. 7, 2010), 7 Pages.

Terpstra, Brett "BetterTouchTool Makes Multi-touch Infinitely More Useful, for Free", retrieved from <http://www.tuaw.com/2010/01/05/bettertouchtool-makes-multi-touch-infinitely-more-useful-for-fr/> on Jul. 20, 2012, (Jan. 5, 2010), 4 pages.

Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.

Wimmer, Raphael et al., "Modular and Deformable Touch-Sensitive Surfaces Based on Time Domain Reflectometry", *In Proceedings of*

(56) References Cited

OTHER PUBLICATIONS

*UIST 2011*, Available at <http://www.medien.ifi.lmu.de/pubdb/publications/pub/wimmer2011tdrTouch/wimmer2011tdrTouch.pdf>,(Oct. 2011),10 pages.

Zivkov, et al., "Touch Screen Mobile Application as Part of Testing and Verification System", *Proceedings of the 35th International Convention*, (May 21, 2012), pp. 892-895.

International Search Report and Written Opinion, Application No. PCT/US2011/055621, (Jun. 13, 2012), 8 pages.

International Search Report, Application No. PCT/US2011/058855, (Nov. 1, 2011), 8 pages.

Non-Final Office Action, U.S. Appl. No. 12/941,693, (Jul. 18, 2012), 19 pages.

International Search Report Mailed Date Sep. 3, 2012, Application No. PCT/US2012/027642, Filing Date : Mar. 4, 2012, pp. 9.

Binns, Francis Styrion, "Multi-"Touch" Interaction via Visual Tracking", Retrieved at <<http://www.cs.bath.ac.uk/~mdv/courses/CM30082/projects.bho/2008-9/Binns-FS-dissertation-2008-9.pdf>>, May 2009, pp. 81.

Baraldi, et al., "WikiTable: Finger Driven Interaction for Collaborative Knowledge-Building Workspaces", Retrieved at <<http://ieeexplore.ieee.org/stamp/stamp.jsp?tp=&arnumber=1640590>>, 2006 Conference on Computer Vision and Pattern Recognition Workshop, Jul. 5, 2006, pp. 6.

Dillencourt, et al., "A General Approach to Connected-Component Labeling for Arbitrary Image Representations", Retrieved at <<http://www.cs.umd.edu/~hjs/pubs/DillJACM92.pdf>>, Journal of the Association for Computing Machinery, vol. 39, No. 2, Apr. 1992, pp. 253-280.

Tao, et al., "An Efficient Cost Model for Optimization of Nearest Neighbor Search in Low and Medium Dimensional Spaces", Retrieved at <<http://www.cais.ntu.edu.sg/~jzhang/papers/ecmonns.pdf>>, IEEE Transactions on Knowledge and Data Engineering, vol. 16, No. 10, Oct. 2004, pp. 36.

Westman, et al., "Color Segmentation by Hierarchical Connected Components Analysis with Image Enhancement by Symmetric Neighborhood Filter", Retrieved at <<http://ieeexplore.ieee.org/stamp/stamp.jsp?tp=&arnumber=118219>>, Proceedings of 10th International Conference on Pattern Recognition, Jun. 16-21, 1990, pp. 796-802.

Input Testing Tool, U.S. Appl. No. 13/659,777, (Oct. 24, 2012),31 pages.

Non-Final Office Action, U.S. Appl. No. 12/941,693, (May 16, 2013),13 pages.

Non-Final Office Action, U.S. Appl. No. 13/183,377, (Jun. 21, 2013),10 pages.

Non-Final Office Action, U.S. Appl. No. 13/293,060, (Jul. 12, 2013), 9 pages.

PCT Search Report and Written Opinion, Application No. PCT/US2013/021787, (May 13, 2013), 9 pages.

"Touch Quality Test Robot", U.S. Appl. No. 13/530,692, filed Jun. 22, 2012, 20 pages.

Benko, Hrvoje et al., "Resolving Merged Touch Contacts", U.S. Appl. No. 12/914,693, filed Nov. 8, 2010,22 pages.

Cao, Xiang et al., "Evaluation of an On-line Adaptive Gesture Interface with Command Prediction", *In Proceedings of GI 2005*, Available at <http://citeseerx.ist.psu.edu/viewdoc/download;jsessionid=DAB1B08F620C23464427932BAF1ECF49?doi=10.1.1.61.6749&rep=rep1&type=pdf>,(May 2005),8 pages.

Cao, Xiang et al., "ShapeTouch: Leveraging Contact Shape on Interactive Surfaces", *In Proceedings of TABLETOP 2008*, Available at <http://www.cs.toronto.edu/~caox/tabletop2008_shapetouch.pdf>,(2008),pp. 139-146.

Dang, Chi T., et al., "Hand Distinction for Multi-Touch Tabletop Interaction", University of Augsburg; Institute of Computer Science; *Proceedings of the ACM International Conference on Interactive Tabletops and Surfaces*, (Nov. 23-25, 2009),8 pags.

Tsuchiya, Sho et al., "Vib-Touch: Virtual Active Touch Interface for Handheld Devices", *In Proceedings of the 18th IEEE International Symposium on Robot and Human Interactive Communication*, Available at <http://www.mech.nagoya-u.ac.jp/asi/en/member/shogo_okamoto/papers/tsuchiyaROMAN2009.pdf>,(Oct. 2009),pp. 12-17.

Wilson, Andrew D., "TouchLight: An Imaging Touch Screen and Display for Gesture-Based Interaction", *In Proceedings of ICIM 2004*, Available at <http://citeseerx.ist.psu.edu/viewdoc/download-?doi=10.1.1.95.3647&rep=rep1&type=pdf>,(Oct. 2004),8 pages.

PCT Search Report and Written Opinion, Application No. PCT/US2012/024780, (Sep. 3, 2012), 9 pages.

Final Office Action, U.S. Appl. No. 12/941,693, (Nov. 26, 2012), 22 Pages.

Non-Final Office Action, U.S. Appl. No. 13/152,991, (Mar. 21, 2013), 10 pages.

Final Office Action, U.S. Appl. No. 13/152,991, (Sep. 20, 2013),14 pages.

Final Office Action, U.S. Appl. No. 13/183,377, (Oct. 15, 2013),12 pages.

Final Office Action, U.S. Appl. No. 13/293,060, (Sep. 25, 2013),10 pages.

Non-Final Office Action, U.S. Appl. No. 13/293,060, (Nov. 29, 2013),11 pages.

"PCT Search Report and Written Opinion", Application No. PCT/US2013/046208, Sep. 27, 2013, 12 pages.

"Non-Final Office Action", U.S. Appl. No. 13/154,161, Jan. 3, 2014, 14 pages.

"Non-Final Office Action", U.S. Appl. No. 12/941,693, Nov. 18, 2013, 21 Pages.

"Notice of Allowance", U.S. Appl. No. 13/198,415, Dec. 26, 2013, 8 pages.

"Foreign Office Action", CN Application No. 201210018527.8, Feb. 24, 2014, 10 Pages.

"Foreign Office Action", CN Application No. 201210029859.6, Feb. 21, 2014, 15 Pages.

"Final Office Action", U.S. Appl. No. 13/530,692, Apr. 10, 2014, 16 pages.

"Final Office Action", U.S. Appl. No. 13/154,161, Apr. 22, 2014, 16 pages.

"International Search Report & Written Opinion for PCT Application No. PCT/US2013/061067", Mailed Date: Feb. 7, 2014, Filed Date: Sep. 21, 2013, 11 Pages.

Non-Final Office Action, U.S. Appl. No. 13/530,692, Jan. 31, 2014, 14 pages.

Non-Final Office Action, U.S. Appl. No. 13/152,991, Mar. 21, 2014, 18 pages.

Non-Final Office Action, U.S. Appl. No. 13/198,036, Jan. 31, 2014, 14 pages.

Non-Final Office Action, U.S. Appl. No. 13/099,288, Feb. 6, 2014, 13 pages.

Non-Final Office Action, U.S. Appl. No. 13/183,377, Feb. 27, 2014, 12 pages.

\* cited by examiner

MULTI-PASS TOUCH CONTACT TRACKING

RELATED APPLICATION

This application claims priority to U.S. Provisional Application Ser. No. 61/449,538 filed Mar. 4, 2011 entitled "Multi-Pass Touch Contact Tracking" to Zhao et al., the disclosure of which is incorporated by reference herein in its entirety.

BACKGROUND

Portable computing devices, such as mobile phones, portable and tablet computers, entertainment devices, handheld navigation devices, and the like increasingly offer more functions and features which can make it difficult for a user to navigate and select commands that are relevant to a function the user wants to initiate on a device. In addition to the traditional techniques used to interact with computing devices, such as a mouse, keyboard, and other input devices, touch sensors and touch-screen displays are commonly integrated in mobile phones and tablet computers, and are utilized both for display and user-selectable touch and gesture inputs. A continuing design challenge with these types of portable devices having touch sensors and/or touch-screen displays is the touch signal processing to track touch and gesture inputs that are identified from successive frames of sensor image data. Touch contacts on a touch-screen display represent the motion trace of a gesture, such as when a user uses his or her fingers to contact a touch-screen display and gesture while maintaining the contact with the display. A failure to correctly track and interpret the motion trace of a touch contact for a gesture input can lead to the failure of gesture recognition operations and gesture tracking processing.

For a gesture motion that is a relatively small or short gesture, conventional tracking processing may statically match the spatially co-located touch contacts from successive frames. However, this approach is not effective for a gesture motion that is a relatively large or long gesture, such as may be typically used on a tablet computer or other type of slate form factor where fast gestures such as flicker or panning are involved. The tracking processing may not be sensitive to the complete motion of a gesture, which can result in a gesture "break", which may then be recognized and processed as much shorter motion ranges than the actual gesture motion. Alternatively, if the tracking processing is overly sensitive to the gesture motion, this can lead to mis-tracking the touch contacts, such as when a user inputs text with a soft or virtual keyboard that is displayed on a touch-screen display.

SUMMARY

This Summary introduces simplified concepts of multi-pass touch contact tracking, and the concepts are further described below in the Detailed Description and/or shown in the Figures. This Summary should not be considered to describe essential features of the claimed subject matter, nor used to determine or limit the scope of the claimed subject matter.

Multi-pass touch contact tracking is described. In embodiments, touch input sensor data is recognized as a series of components of a contact on a touch-screen display. The components can be determined to correlate to the contact based on multi-pass nearest-neighbor contact mapping that includes forward nearest-neighbor contact mapping of the components and reverse nearest-neighbor contact mapping of the components. The reverse nearest-neighbor contact mapping is initiated when unmapped components remain after the forward nearest-neighbor contact mapping. The components can then be associated to represent a tracking of the contact. Subsequent components of the contact can also be determined and associated with the previous components of the contact to further represent the tracking of the contact.

BRIEF DESCRIPTION OF THE DRAWINGS

Embodiments of multi-pass touch contact tracking are described with reference to the following Figures. The same numbers may be used throughout to reference like features and components that are shown in the Figures.

DETAILED DESCRIPTION

Figure 1:
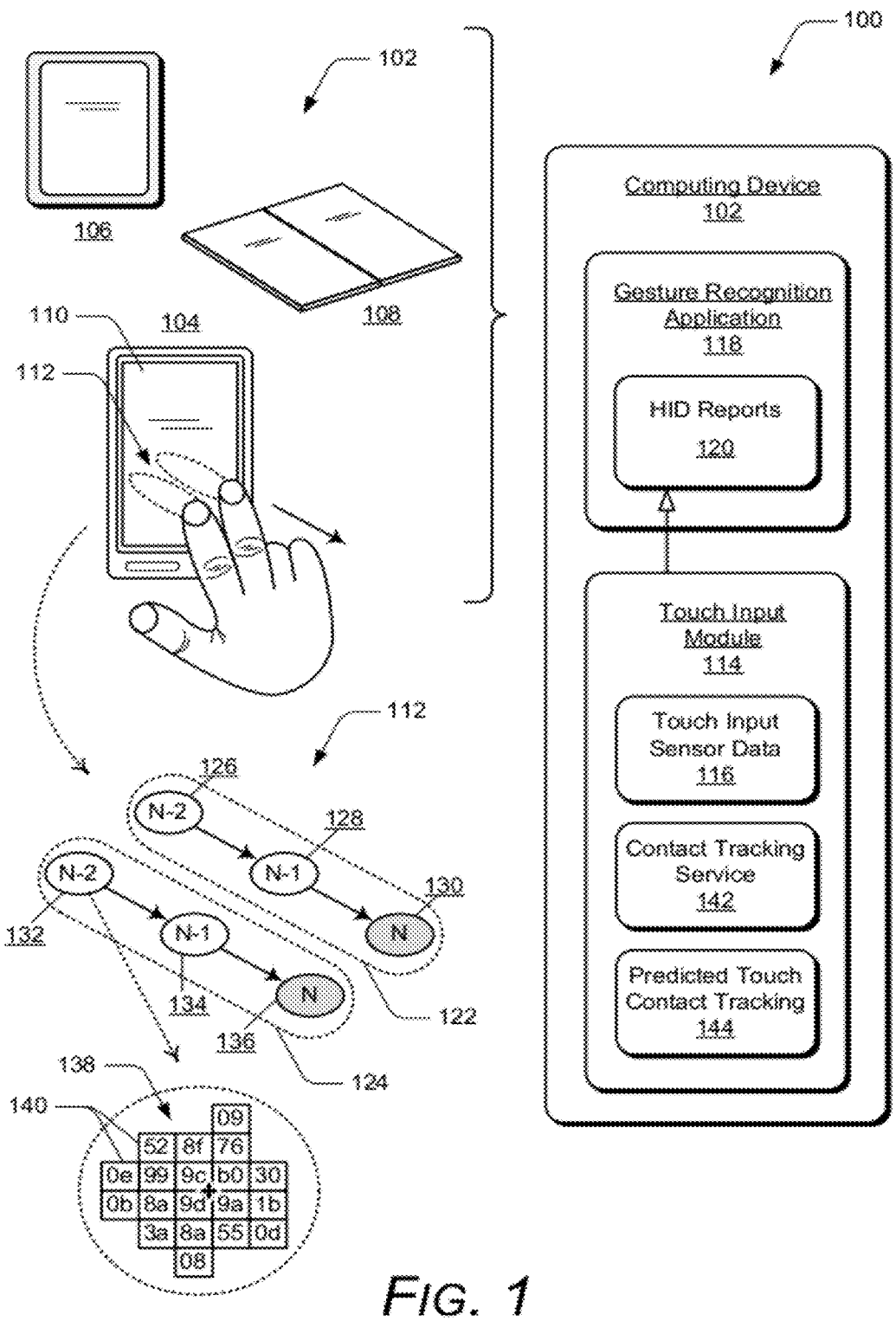
FIG. 1 illustrates an example system in which embodiments of multi-pass touch contact tracking can be implemented.

Embodiments of multi-pass touch contact tracking are described. As noted above, touch and gesture inputs on a touch-screen display of a computing device, such as a mobile phone or portable computer, may not be accurately tracked and/or processed. Multi-pass touch contact tracking uses the prediction of components at touch positions from previous frames, and the tracking can be reliably achieved in the case of high motion while at the same time, mis-tracking in the case of a soft keyboard can be avoided. Touch contact tracking can be based on the predicted positions of previously identified components of a contact, with a set of rules defining the scope of validity of the tracking obtained by the prediction. In embodiments, multi-pass contact tracking is implemented for contact tracking with prediction based on nearest-neighbor distance matching (e.g., an algorithm or procedure), and a technique is implemented for nearest-neighbor distance matching in both forward and reverse directions.

Touch signal processing involves tracing the touch contacts identified from successive frames of touch input sensor data. When the motion of the touch contacts are relatively high, a prediction via a min-max distance determination can be implemented to sort the maximum distances in different permutations of the possible component mappings for different finger contacts of a multi-finger gesture input. The computational cost is proportional to N!, where N is the number of fingers used for the gesture input. This may be prohibitive when the N is more than ten fingers, such as when two or more users are interacting with a touch-screen and/or playing a game. An alternative solution implements forward and reverse passes (e.g., multi-pass) nearest-neighbor distance matching.

The tracking accuracy and results are comparable to the min-max distance determination technique when the motion velocity is smaller, and the computational cost is proportional to $N^2$ instead of N!, which is less processing intensive. Embodiments provide a solution of computing the contact tracking with the multi-pass solution based on the nearest-neighbor distance matching in both the forward and reverse directions, such as when the prediction of the contacts from the previous frames are well-defined. In the event that a prediction does not exist, the original solution to initiate the prediction via min-max distance determination can still be applied. Alternately, some limiting approach can be implemented to avoid the min-max scheme altogether.

Embodiments of multi-pass touch contact tracking can include a prediction based two-level procedure for component identification and contact tracking. A first-level of procedure is used to establish an initial association of components of a contact for gesture input tracking based on a prediction, and a second level of procedure is used to validate based on a nearest-neighbor contact mapping criteria to generate a final association of the components of a contact. Also related is a set of rules defining the operations for multi-finger touch and gesture recognition. This may be implemented for any slate based device, tablet device, mobile phone or computer with a touch-screen display, as well as for other similar technologies such as surface, indirect touch, etc.

While features and concepts of multi-pass touch contact tracking can be implemented in any number of different devices, systems, environments, networks, and/or configurations, embodiments of multi-pass touch contact tracking are described in the context of the following example devices, systems, and methods.

FIG. 1 illustrates an example system 100 in which various embodiments of multi-pass touch contact tracking can be implemented. The example system includes a computing device 102, which may be any one or combination of a mobile phone 104, entertainment device, navigation device, user device, wireless device, portable device, tablet computer 106, dual-screen folding device 108, and the like. The computing device includes an integrated touch-screen display 110, which is implemented to sense a gesture input 112, such as a user-initiated gesture in a user interface that is displayed on the touch-screen display. In this example, the gesture input is a two finger gesture across the touch-screen display in an approximate direction indicated by the arrow, but may be a single finger gesture input, or a multi-finger gesture input (e.g., three or more finger gesture input). Any of the computing devices can be implemented with various components, such as one or more processors and memory devices, as well as any number and combination of differing components as further described with reference to the example device shown in FIG. 13 to implement embodiments of multi-pass touch contact tracking.

In the example system 100, the computing device 102 includes a touch input module 114 (e.g., a lower layer component) that is implemented to recognize touch input sensor data 116 as the gesture input 112 on the touch-screen display 110. The computing device also includes a gesture recognition application 118 (e.g., a higher layer component) that receives the touch input sensor data from the touch input module as HID reports 120 (i.e., human interface device reports). The HID reports include a time and position data, as well as determined touch contact tracking, that correlates to gesture inputs on the touch-screen display of the computing device. The gesture recognition application 118 is implemented to recognize and generate various gestures as determined from touch input data (e.g. the HID reports 120) associated with inputs or combinations of inputs, such as the gesture input 112. The gesture recognition application can generate various gestures, such as select gestures, hold gestures, motion gestures, tap gestures, and other types of gestures from various user-selectable inputs.

An input recognition system of the computing device 102 may include any type of input detection features and/or devices to distinguish the various types of inputs, such as sensors (capacitive or resistive), light sensing pixels, touch sensors, cameras, and/or a natural user interface that interprets user interactions, gestures, inputs, and motions. In implementations, the input recognition system can detect motion inputs from discernable variables, such as from a direction variable, from start region position variables and end region position variables, and/or from a motion rate variable (e.g., a particular number of pixels per second).

As described herein, a gesture input may be recognized as a user input with one or more fingers on a touch-screen display of a device, and the gesture input includes one or more contacts that each correlate to the input of a finger on the touch-screen display. In the FIG. 1 example, the two-finger gesture input 112 includes two contacts identified as a first contact 122 that correlates to a first finger of the gesture input, and a second contact 124 that correlates to a second finger of the gesture input.

The gesture input data is received as a series of frames, and a frame includes a component that represents one touch position of a contact (e.g., along a gesture input that is one finger). For a two-finger gesture input, a frame can include a component of a first contact that correlates to the input of a first finger, and include a component of a second contact that correlates to the input of a second finger (and so on for more than a two-finger gesture input).

In the FIG. 1 example, the first contact 122 of the gesture input 112 includes successive components, such as component 126, component 128, and component 130 at different touch positions along the first contact. Similarly, the second contact 124 of the gesture input 112 includes successive components, such as component 132, component 134, and component 136 at different touch positions along the second contact. Accordingly, a first frame of the two-finger gesture input includes the component 126 and the component 132 of the respective first and second contacts at N-2 in the series of components. Similarly, a next frame of the gesture input at N-1 includes the component 128 and the component 134 of the respective first and second contacts, and a current frame of the gesture input at N includes the component 130 and the component 136 of the respective first and second contacts.

Therefore, a contact of a gesture input spans multiple frames and includes the components from each successive frame that have been identified as correlating to the contact, or to a section of the contact. A component represents a touch position of a contact in a frame (e.g., after the component has been identified as correlating to the contact). As described in embodiments, a component can be identified as correlating to a particular contact based on a nearest-neighbor contact mapping criteria that evaluates distance between component positions. However, if the nearest-neighbor contact mapping does not identify a component to one of the existing contacts, then a new contact of the gesture input can be generated to represent the tracking of an additional finger used to gesture on the touch-screen display.

The touch input module 114 recognizes the touch input sensor data 116 as the series of components of the two contacts 122, 124 of the gesture input 112 on the touch-screen display 110 of the computing device 102. In embodiments, the touch input module 114 is implemented to generate a sensor map 138 from the touch input sensor data 116 for each component of each contact. A sensor map represents an individual component of a contact, such as when a user initiates the gesture input 112 on the touch-screen display 110. In this example, the sensor map includes elements 140 shown as 8-bit hex values that represent the signal strength at an element position in the sensor map. A stronger sensor signal of the touch input sensor data indicates more touch contact with an element in the sensor map. The sensor map can be generated as a two-dimensional array, and array indices of the elements in the two-dimensional grid correlate to sensed touch contact from the gesture input on the touch-screen display. The stationary baseline level can be subtracted out so that the elements in an area around the sensor map that are not detected as part of the touch contact are normalized to a zero level.

The computing device 102 also includes a contact tracking service 142 that is implemented to determine predicted touch contact tracking 144 that corresponds to one or more contacts of a gesture input on the touch-screen display 110, such as the gesture input 112. The contact tracking service can be implemented as computer-executable instructions, such as a software application, and executed by one or more processors to implement the various embodiments described herein. The contact tracking service can also be implemented as firmware on dedicated sensor device hardware in the computing device. In this example, the contact tracking service is shown implemented as a component of the touch input module 114. Alternatively, the contact tracking service may be implemented as an independent software application or service to predict touch contact tracking.

In embodiments, the contact tracking service 142 is implemented to perform various procedures and/or algorithms of multi-pass touch contact tracking. The contact tracking service can identify and predict components of the gesture input that are mapped (e.g., correlated, associated) as the two contacts. The components 126-130 represent a tracking of the first contact 122, and the components 132-136 represent a tracking of the second contact 124. The components that are identified as correlating to a particular contact are all assigned the same identifier. For example, the components 126-130 of the first contact 122 are all assigned the same first identifier, and the components 132-136 of the second contact 124 are all assigned the same second identifier, where the first and second identifiers are different to distinguish the separate contacts. As further described below, the contact tracking service can validate that a predicted component position correlates to a subsequent component of a contact based on a nearest-neighbor criteria that evaluates distance from the predicted component position to the additional components of the contact. Additionally, the contact tracking service can determine that components correlate to a particular contact based on a min-max distance determination between the components of the contact.

Example methods 200 and 1200 are described with reference to respective FIGS. 2 and 12 in accordance with one or more embodiments of multi-pass touch contact tracking. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 2:
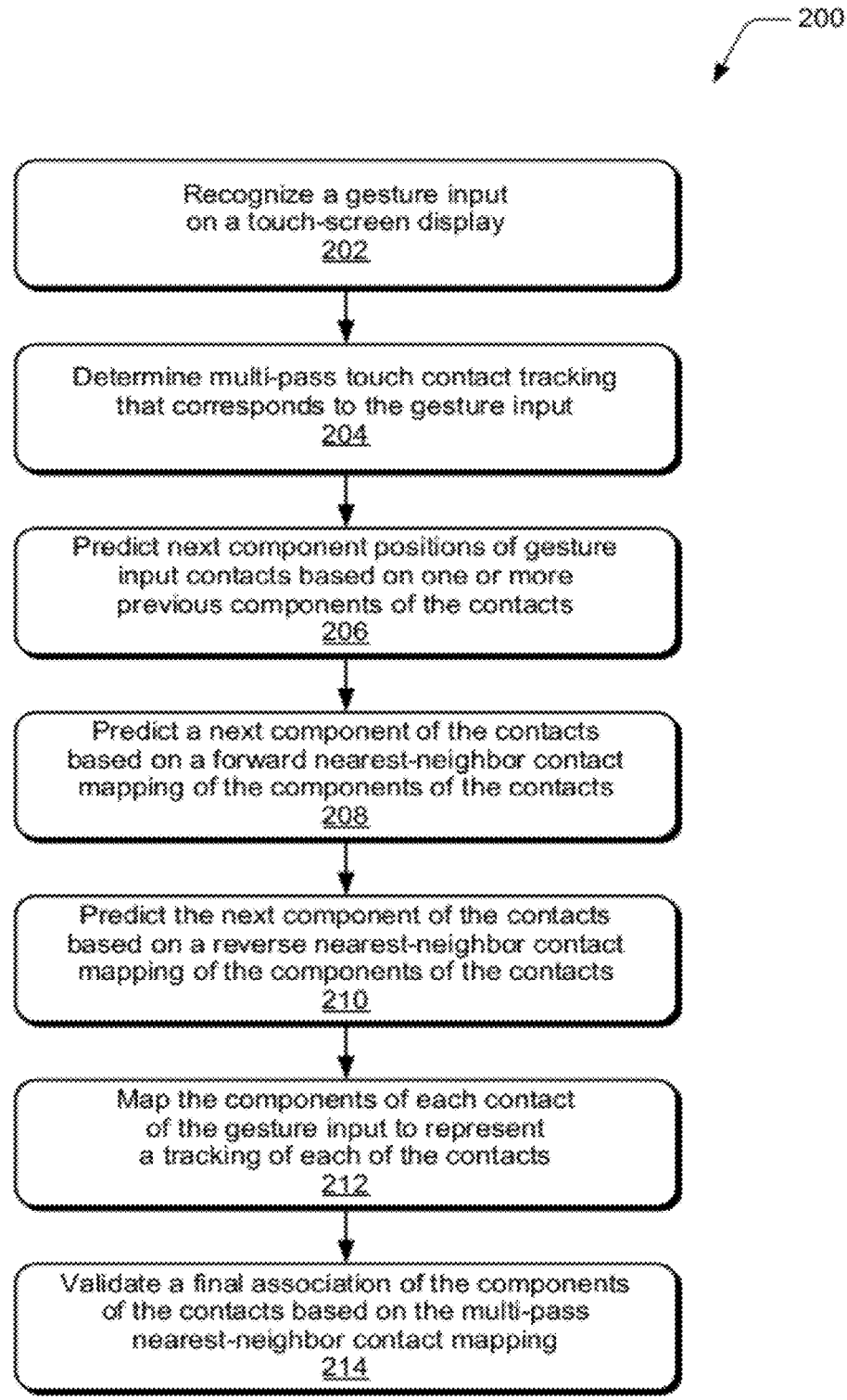
FIG. 2 illustrates example method(s) of multi-pass touch contact tracking in accordance with one or more embodiments.

FIG. 2 illustrates example method(s) 200 of multi-pass touch contact tracking. The order in which the method blocks are described are not intended to be construed as a limitation, and any number of the described method blocks can be combined in any order to implement a method, or an alternate method.

At block 202, a gesture input is recognized on a touch-screen display. For example, the touch input module 114 (FIG. 1) at the computing device 102 recognizes various inputs or combinations of inputs, such as the gesture input 112 on the touch-screen display 110 of the example device 104. In this example, the gesture input 112 is a two-finger gesture input that includes the two contacts identified as the first contact 122 that correlates to a first finger of the gesture input, and the second contact 124 that correlates to the second finger of the gesture input.

At block 204, multi-pass touch contact tracking is determined that corresponds to the gesture input. At block 206, next component positions of gesture input contacts is predicted based on one or more previous components of the contacts. At block 208, a next component of the contacts is predicted based on a forward nearest-neighbor contact mapping of the components of the contacts. At block 210, the next components of the contacts are predicted based on a reverse nearest-neighbor contact mapping of the components of the contacts. At block 212, the components of each contact of the gesture input are mapped to represent a tracking of each of the contacts. At block 214, a final association of the components of the contacts is validated based on the forward and reverse nearest-neighbor contact mapping.

For example, the contact tracking service 142 (FIG. 1) at the computing device 102 determines multi-pass touch contact tracking that corresponds to the gesture input 112 on the touch-screen display 110 of the example device 104. The contact tracking service also predicts next component positions of gesture input contacts based on a forward nearest-neighbor contact mapping of the components of the contacts; predicts the next components of the contacts based on reverse nearest-neighbor contact mapping of the components of the contacts; maps (e.g., correlates, associates) the components of each contact of the gesture input to represent a tracking of each of the contacts; and/or validates a final association of the components of the contacts based on the forward and reverse nearest-neighbor contact mapping.

Figure 3:
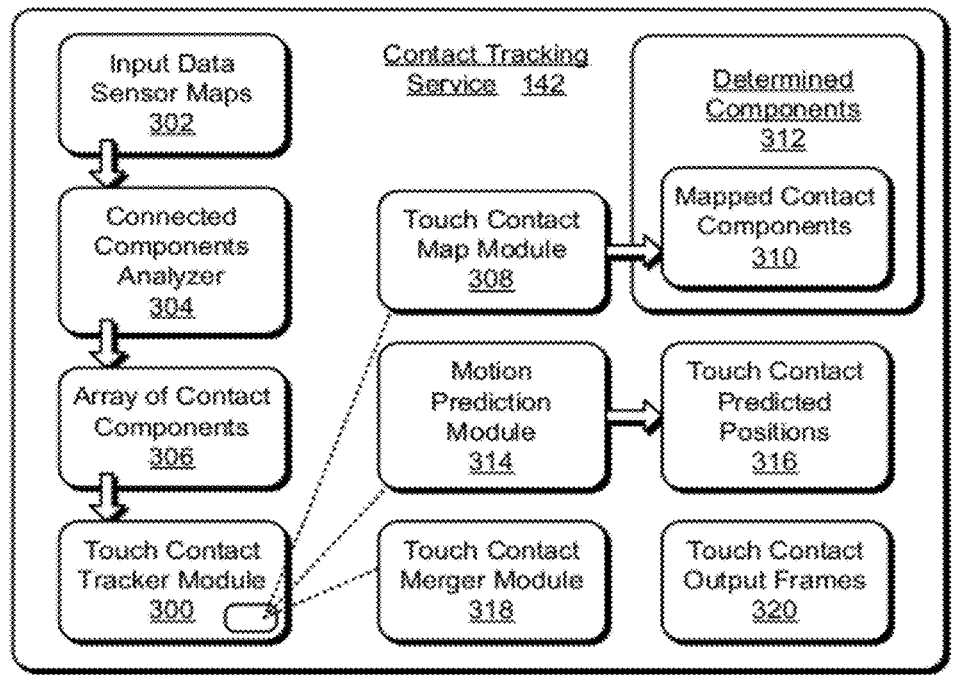
FIG. 3 illustrates an example architecture of a contact tracking service in accordance with one or more embodiments.
Figure 4:
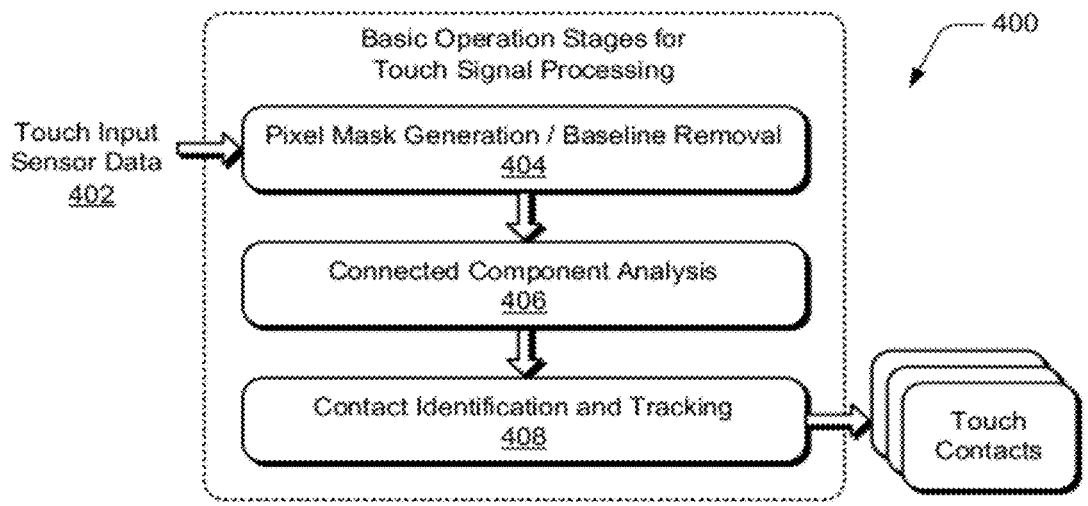
FIG. 4 illustrates an example architecture for processing multi-pass touch contact tracking in accordance with one or more embodiments.
Figure 5:
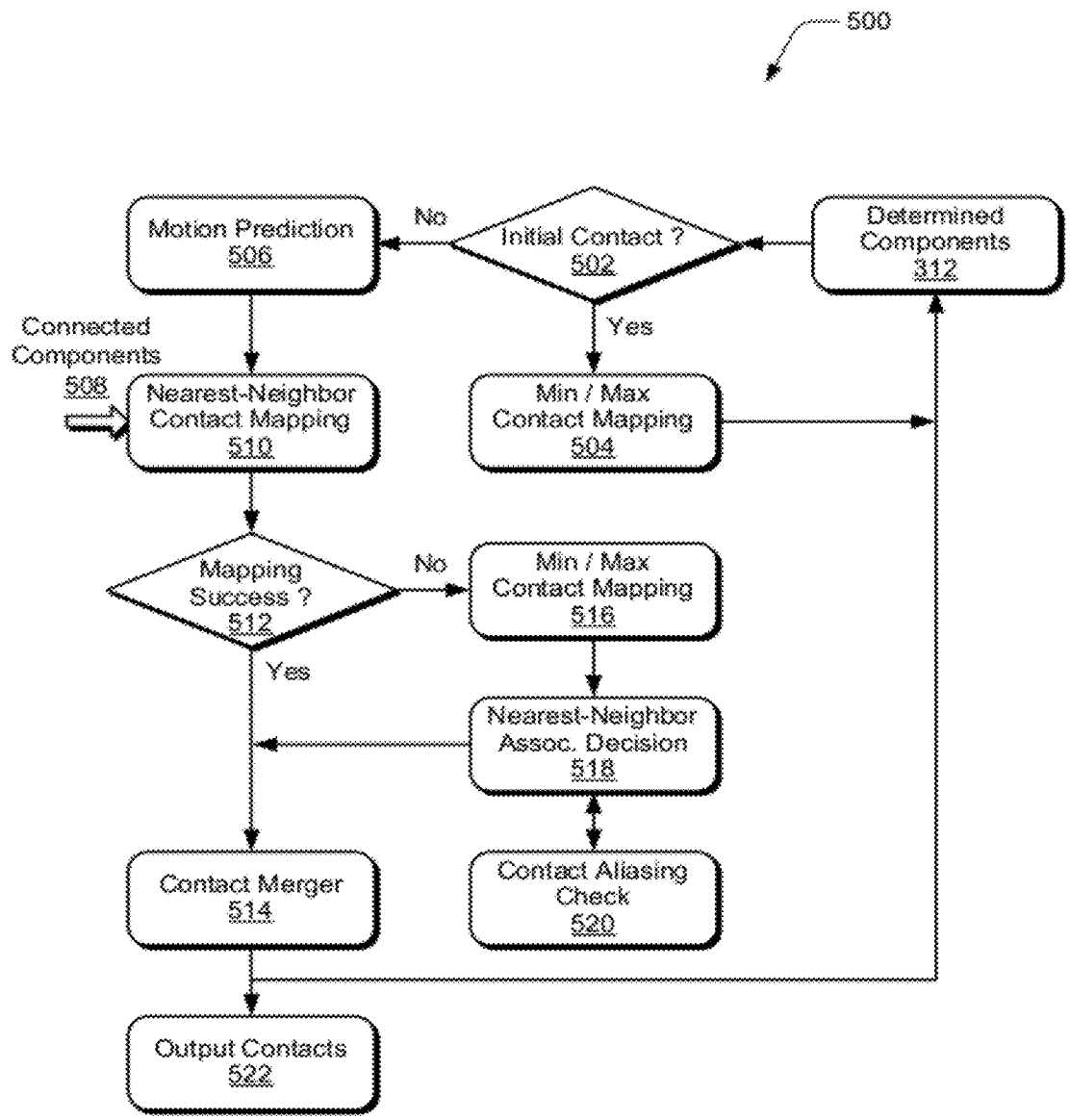
FIG. 5 illustrates a high-level flow diagram for multi-pass touch contact tracking in accordance with one or more embodiments.

FIG. 3 illustrates an example implementation and various components of the contact tracking service 142 that is described with reference to FIG. 1, and which is implemented for touch signal processing. FIG. 4 illustrates an example architecture 400 for processing multi-pass touch contact tracking and is described with reference to the touch input module 114 shown in FIG. 1, and with reference to the contact tracking service 142 shown in FIGS. 1 and 3. FIG. 5 illustrates a high-level flow diagram 500 of multi-pass touch contact tracking implemented by a touch contact tracker module 300 (also referred to as the "contact tracker") that is shown as a component of the contact tracking service 142 in FIG. 3.

Touch input sensor data 116 is input at 402 (FIG. 4) (e.g., received at the touch input module 114), and a sensor unit of the touch input module generates sensor maps 302 (FIG. 3) from the touch input sensor data for each component of a contact of a gesture input. A baseline level can be subtracted out, or otherwise removed, for elements around a sensor map that are normalized to a zero level at 404. For example, the sensor map 138 can be generated as a two-dimensional grid with a pitch of 5 mm and an element depth of eight to sixteen bits. A connected components analyzer 304 is implemented for connected component analysis at 406. The connected components analyzer receives the normalized sensor maps 302 as an input and generates an array 306 of the connected contact components that represent the touch contacts replaced by components of a gesture input. The touch contact tracker module 300 is implemented for component identification and contact tracking at 408 to associate (e.g., correlate or map) the components from previous frames and the components at touch positions in a current frame that represent the traces (e.g., tracking) of a continuous gesture motion, such as the tracking of the first contact 122 and the tracking of the second contact 124.

In FIG. 5, a set of touch contacts from a previous frame are examined for predictability when each new frame is received as input at block 502. Touch contacts that are still in the initial tracking stage (i.e., "yes" from block 502), and before a sufficient history of touch contact association has been established, are input to a touch contact map module 308 (also referred to as the "contact mapper") for min-max contact mapping at block 504. The min-max contact mapping generates an initial association of mapped contact components 310, which are then output and buffered as determined components 312 with a history of association for future frames.

Touch contacts that are not initial touch contacts (i.e., "no" from block 502), such as when at least two previous frames have been received, are input to a motion prediction module 314 for motion prediction at block 506 to generate touch contact predicted positions 316. These touch contact predicted positions, along with the connected components 508 of the current frame, are input into the touch contact map module 308 for nearest-neighbor contact mapping at block 510, which is based on the forward nearest-neighbor distance matching algorithm (e.g., procedure or determination). The result of the nearest-neighbor distance matching is checked against a criterion at 512 to determine whether the components of the current frame have been successfully mapped to previous components of a contact.

If the mapping of the components is successful (i.e., "yes" from block 512), then the mapped association is input to a touch contact merger module 318 at block 514. If the mapping of the components is not successful (i.e., "no" from block 512), then the components are input to the touch contact map module 308 for min-max contact mapping at block 516 and a two-level combinatory mapping is invoked. With the input from the motion prediction module 314 (i.e., as output at block 506) and the connected components 508, the min-max contact mapping attempts to establish a first level nearest-neighbor association between these two sets of component positions based on a min-max distance determination, along with a set of rules involving hand and/or finger kinematic dynamics.

The min-max scheme can be implemented to compute the distances between all pairs of components in a potential matching. For a configuration with N touch positions mapping to N components, the number of potential matching equals N! and for each match, a computation of the distances and a sorting of its maximum distance is determined. If the min-max distance determination is initiated when a forward nearest-neighbor distance determination fails to match components, a delay in processing may be noticeable to the user as a glitch.

For those contacts that do not have a mapping established at the first level (e.g., at block 518), they are routed over all of the components for a contact aliasing check at block 520 to determine possible aliasing, which may be merged contacts as determined at block 514 by the touch contact merger module 318. A single component may associate to multiple touch contact positions, which can occur when multiple fingers of a gesture input motion move closer to appear as a single component based on the touch input sensor data. To detect a touch contact merger, for any unmapped component after a first-level contact association, a nearest-neighbor verification can be initiated for contact associations for all of the components, and any match indicates an aliased association between a single component and multiple touch positions.

The touch contact merger module 318 processes and resolves the merged components, such as to independently check whether two touch positions have the same [x,y] grid point coordinates. A contact merger may include multiple touch positions aliased to one component, as well as a scenario of merge-on-landing when a first touch position is already sensed or detected as a first finger touches on a touchscreen display and a user lands a second finger closely next to the first one. The two touch positions may then be detected as merged together in one larger component.

Figure 6:
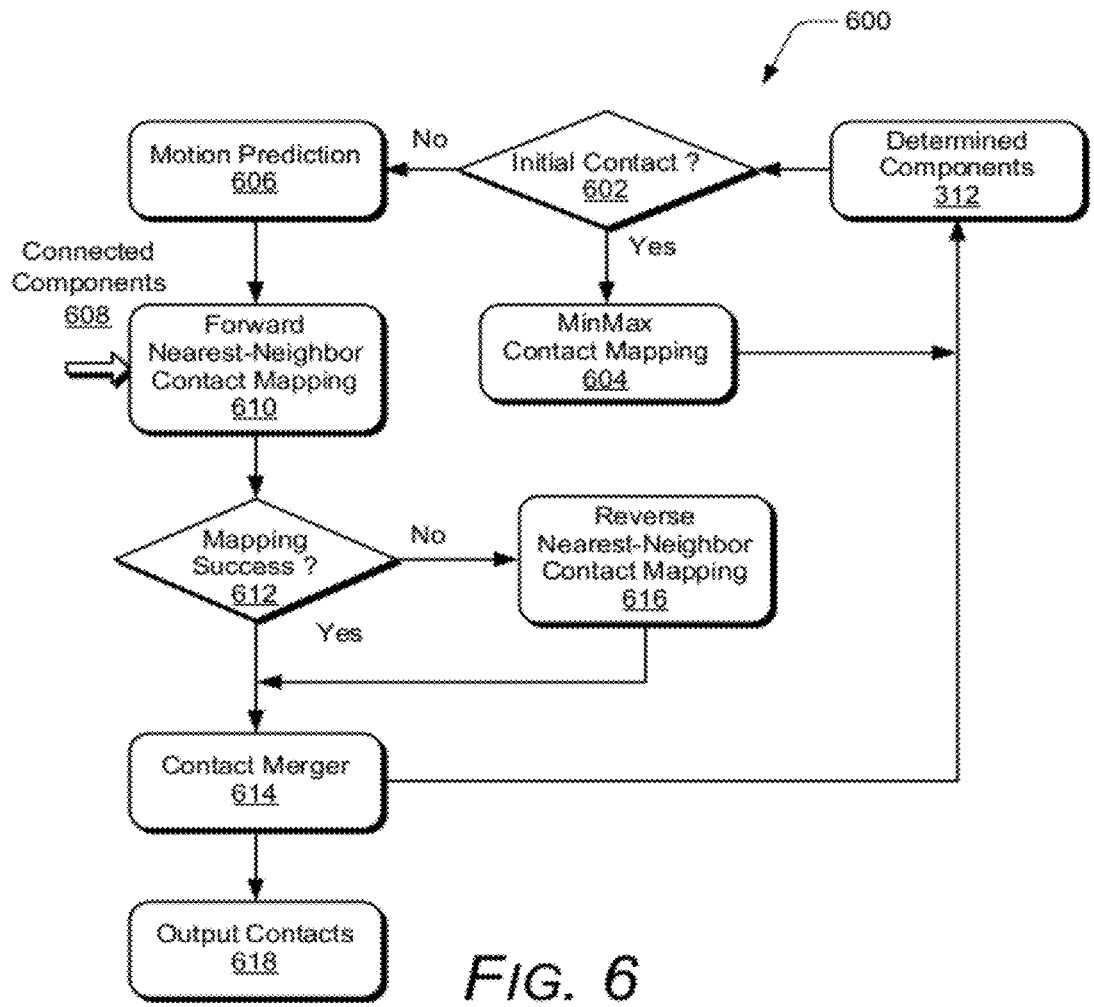
FIG. 6 illustrates another flow diagram for multi-pass touch contact tracking in accordance with one or more embodiments.

FIG. 6 illustrates another high-level flow diagram 600 of multi-pass touch contact tracking implemented by the touch contact tracker module 300 (also referred to as the "contact tracker") that is shown as a component of the contact tracking service 142 in FIG. 3. The example diagram 600 is similar to the diagram 500 shown in FIG. 5, except that the three operations for the min-max mapping 516, the nearest-neighbored decision for association 518, and the contact aliasing check at 520 are replaced with a reverse nearest-neighbor contact mapping at 616. Additionally, the nearest-neighbor contact mapping at 510 is replaced with a forward nearest-neighbored contact mapping at 610. A multi-pass nearest-neighbor distance determination includes the forward nearest-neighbor contact mapping of components and the reverse nearest-neighbor contact mapping of the components.

Figure 7:
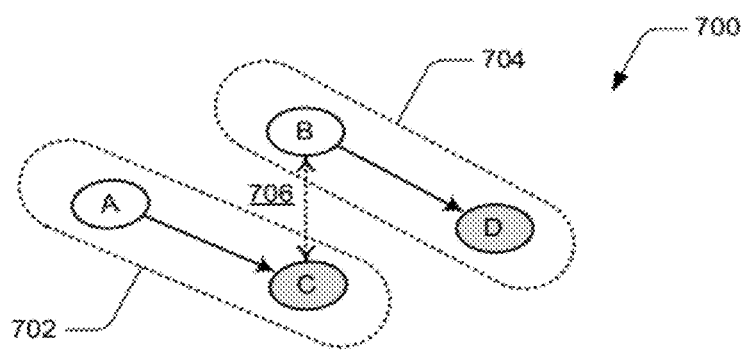
FIG. 7 illustrates an example of multi-pass nearest-neighbor contact mapping in accordance with one or more embodiments.

FIG. 7 illustrates an example 700 of multi-pass nearest-neighbor contact mapping, such as applied to a two-finger gesture input that includes two contacts identified as a first contact 702 that correlates to a first finger of the gesture input, and a second contact 704 that correlates to a second finger of the gesture input. The first contact 702 includes successive components, such as component A and component C at different touch positions along the first contact. Similarly, the second contact 704 includes successive components, such as component B and component D at different touch positions along the second contact. The operation of forward nearest-neighbored contact mapping 610 searches for a component which is nearest to the predicted location of a contact. When such component is found and the distance to the prediction point of the contact is smaller than a defined threshold, an association can be established to associate the component with the contact. Note that the defined distance is not in a uniform metric, but rather is stretched along the direction of the velocity in order to compensate for the possible inaccuracy caused by the prediction at high velocity.

A failure of the forward nearest-neighbor contact mapping can be attributed to the non-uniform nature of the distance used for a nearest-neighbor distance determination. As shown in FIG. 7, the component A is at a predicted position that should match to component C of the first contact 702, and similarly, the component B is at a predicted position that should match to component D of the second contact 704. The dashed lines of the contacts represent a velocity-skewed metric for distance comparison. However, due to proximity, the forward nearest-neighbor contact mapping 610 would match the predicted position of component B with component C as shown at 706. The result of this forward nearest-neighbor contact mapping is that both of the components A and B would be matched to component C as a 2-1 contact merge, and the component D is left unmapped, which may then be determined as a beginning of a new contact, thus causing a contact matching break of the contact 704.

In embodiments, the reverse nearest-neighbor contact mapping 616 is implemented to resolve the situation of a component left unmapped, with a reverse pass after the forward nearest-neighbor matching pass. The reverse pass starts with the unmapped component D, and determines the best match from all of the other components in the contacts. Once an optimal component match is determined, such as the component B in this example, all of the associations on component B that were previously established during the forward nearest-neighbor mapping are released. This results in newly unmapped components, such as component C, and the reverse nearest-neighbor contact mapping is applied to these newly unmapped components in the reverse direction until there are no more unmapped components.

The forward nearest-neighbor contact mapping is initiated at 610 for each unmapped component to determine a matching contact. The result of the forward nearest-neighbor contact mapping is checked at 612 to determine whether all of the unmapped components of the current frame have been successfully mapped to previous components of a contact. If the mapping of the components is not successful (i.e., "no" from block 612), then all of the component to contact mappings are disconnected (e.g., released) and the reverse nearest-neighbor contact mapping is initiated at 616.

The use of processing resources for reverse nearest-neighbor contact mapping is minimal due to the proportional number of unmatched components. The propagation in the reverse direction is also minimal, as the process correlates to the three or four fingers of a user's hand staying together and moving at a fast speed along with the direction that the gesture input spans. For any components that are determined as unmapped due to a new finger making contact with the touch-screen display, the multi-pass touch contact tracking does not compromise the validity of the new contact as a new input because a newly determined touch contact is typically a distance far enough from the predicted touch positions, and thus the reverse nearest-neighbor contact mapping will exit after the first iteration.

Figure 8:
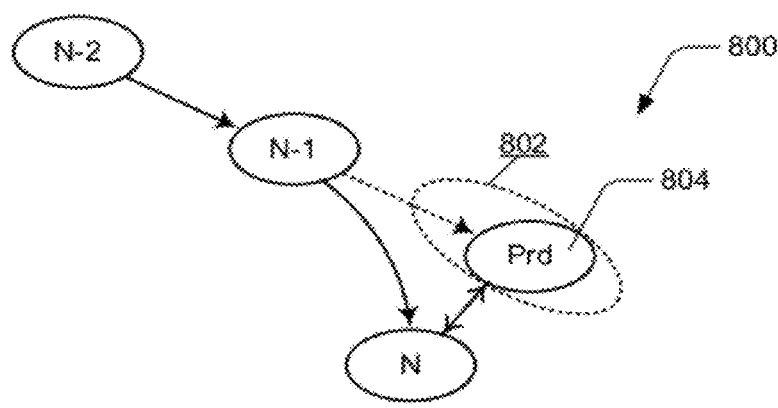
FIG. 8 illustrates an example of motion prediction for a decision region in accordance with one or more embodiments.

FIG. 8 illustrates an example 800 of motion prediction for a decision region 802 that represents a predicted component position 804 of a contact given the tracking of the contact, such as a contact of the gesture input 112 on the touch-screen display 110 of the example device 104 (FIG. 1). In embodiments, the motion prediction module 314 (FIG. 3) of the contact tracking service 142 is implemented for motion prediction when the gesture input begins on the touch-screen display at position N-2 and continues the tracking of the contact to position N-1 and then to position N. The component at position N is determined as the component that is associated with the components at N-2 and N-1 based on proximity to the predicted component position 804. When there is an association for a component identified as i in previous N-frames, then the position of the component in the current frame of $X_i$ can be predicted thru a linear combination of the previous component positions of the contact, as in the following equation:

$$\hat{X}_t(t) = \sum_{k=1}^{N} a_k X_i(t-k)$$

If N=3 for example, one solution is a constant a1=2.5, a2=−2, and a3=0.5 determined via the simple constant acceleration condition. If N=2 for example, then a solution is a1=2 and a2=−1. In general, these coefficients may be time-dependent variables and a more advanced technique, such as a Kalman filter, can be utilized to determine the parameters through an iterative procedure.

For each component $\hat{X}_1(t)$ of the $i^{th}$ touch position generated in the prediction stage above, the nearest-neighbor contact mapping attempts to associate a component X(t) of the current frame. A nearest-neighbor contact mapping can be resolved as described herein and/or with other techniques and algorithms. A mapped association can be established when all of the components of a current frame are considered to determine a component with an X(t) that is within the two-dimensional decision region 802 centered around the predicted position $\hat{X}_1(t)$. The decision region can be constructed first with a round shape of radius r which corresponds to an area matching the actual touch shape of the ith contact at the frame t−1. The round shape region is then modified with a velocity related expansion along the direction of the velocity, and with an expansion factor λ proportional to the norm of the velocity. This expansion accounts for the error introduced by the inaccuracy of the velocity prediction. In general, λ can have an upper bound λ max to avoid erroneous association between fingers of a gesture input motion that are close together along the direction of the velocity. In one implementation, λ=(1+λmax|v|)/(1+|v|), however other choices for λ are also possible.

In practice, the procedure of verifying the nearest-neighbor contact mapping criterion can be performed in a reverse procedure. A difference vector: d=X(t)−$\hat{X}_1(t)$ is computed first, and then a reverse scaling on d is performed with the factor 1/λ along the direction of velocity vector: v=X(t−1)−X(t−2). The norm of the resultant vector d is then checked against the radius r of the decision region, and a value smaller than r indicates that an association has been determined Another extension of the nearest-neighbor contact mapping is to implement a probabilistic approach, where a probability distribution function of the vector d is defined, and instead of passing a hard decision of which touch the component X(t) belongs to, a probability distribution is passed among all of the components. This information can be passed through the HID reports so that the gesture recognition application 118 (FIG. 1) (e.g., a higher layer) can utilize the information.

In embodiments, criteria that nearest-neighbor contact mapping is successful can be established, such as to determine a successful mapping at block 512 (FIG. 5). Generally, the nearest-neighbor contact mapping generates a reliable touch component association. However, in some distributions of touch contact velocity, an unreliable association may be determined, such as when the velocities of the touch positions involved are fast and with substantial acceleration in certain directions. The resulting predicted component locations become closer to that of neighbored components rather than the touch contact component that should be associated with the predicted component.

A simple condition to detect this instance of an unreliable association is to determine that the total number of unassociated components after the nearest-neighbor mapping is greater than the difference between the number of components and the number of touches. Note that this is a sufficient condition in that, theoretically, there may be good mappings classified as a bad mapping. Since the majority of frames have reliable association predictions, the instances of an unreliable association (e.g., a failure case) will likely be of a very small percentage (e.g., less than 5%) with a negligible computational cost. If a failure case is detected, an algorithm or procedure for combinatory contact mapping can be invoked to determine a correct association, as implemented by the touch contact map module 308 of the contact tracking service.

The combinatory contact mapping can establish a reliable mapping between a given set of contacts established in a previous frame and a given set of components in the current frame. When a prediction is determined and the nearest-neighbor contact mapping fails, the combinatory contact mapping can be used to establish a first-level association between the two sets (e.g., the touch positions and the components) by matching the prediction residuals between the prediction positions and that of the components. When a prediction is not determined at the initial phase of a contact life span, the combinatory contact mapping can also be used to establish the initial association. If an initial association of a contact does not exist, as may happen in the first two frames of a new contact, the touch contact map module 308 can then set the original position as the predicted position, and no prediction residual is present. The touch contact map module can include the combinatory contact mapping algorithm, the min-max distance determination algorithm for distance mapping, and a cross-trajectory suppressor for penalizing trajectories of gesture input motions that cross each other. The combinatory contact mapping algorithm can be implemented as described herein via a min-max algorithm and/or with other techniques and algorithms, such as the Hungarian Algorithm.

In embodiments, a nearest-neighbor verification for contact and component association can be implemented. The first-level association that is established with a min-max distance determination (as further described below) can be evaluated with a second-level verification process, which is similar to nearest-neighbor contact mapping. Specifically the component X(t) of the current frame, after the establishment of the initial association to $\hat{X}_i(t)$ at the min-max mapping stage, is confirmed to belong to the $i^{th}$ contact if X(t) falls into a two-dimensional predicted region centered around the predicted position $\hat{X}_i(t)$ of the $i^{th}$ contact. Generally, a difference to the nearest-neighbor contact mapping is that instead of evaluating all of the possible components for a given $\hat{X}_i(t)$, a component with the first-level association is selected for the verification process.

Figure 9:
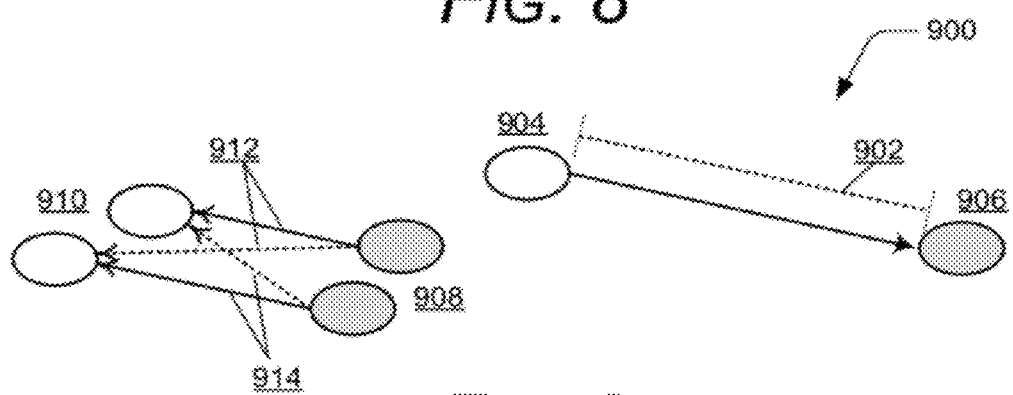
FIG. 9 illustrates an example of min-max distance determination for a multiple level maximum distance determination in accordance with one or more embodiments.

FIG. 9 illustrates an example 900 of min-max distance determination for a multiple level maximum distance determination. In embodiments, the touch contact map module 308 (FIG. 3) of the contact tracking service 142 is implemented to determine an optimal mapping to associate (e.g., determine, correlate) the components of a previous frame to the components of a current frame such that the maximum distance between all mapping pairs within the mapping is minimized. Depending on how the min-max distance determination is applied, the position of a component of the previous frame that is being mapped from may be the predicted position of a component in a subsequent frame.

The min-max distance determination seeks to determine the mapping that has the smallest maximum distance between the components of a previous frame and the components of a current frame. In this example, a maximum distance 902 from a component 904 to a touch position 906 of a subsequent component has already been identified. A mapping is then determined from components 908 in a current frame to components 910 in a previous frame. For example, the determination for a first contact is whether to select the component association represented by the dashed line or the solid line at 912, and the determination for a second contact is whether to select the component association represented by the dashed line or the solid line at 914.

In an equation, P(i) defines a mapping from N to M where N represents the set of numerical labels on the contacts from a previous frame, and M represents the labels of the components in a current frame. More specifically, P(i) is a function of i∈N (range 0 ... N−1) taking the value in M (range 0 ... M−1), such that P(i)≠P(j) for i≠j. Furthermore, P denotes the entire set of all possible P(i), and the best P(i) within P is determined so that the mapping defines an association of current components with previous touch positions that makes the most sense.

For any P(i) in P, an array D(i,P): i ∈ N denotes the distances for each pair i in the mapping. More specifically, for each pair i in the mapping, the distance D(i,P) is defined as the $L^2$ distance between the position of the component of the current frame and the predicted position of the component of the previous frame if the prediction exists, or the position of the component of the previous frame. A descending sort of array of D(i,P) is then initiated and the result is denoted as Sorted D(k,P), where 0≤k<N and:

$$\text{Sorted}D(0,P) \geq \text{Sorted}D(1,P) \ldots \geq \text{Sorted}D(N-1,P)$$

The best P can be obtained when solving the following minimization problem: BestP=arg $\min_{P \in P}(ED(P)+\lambda_0 *EC(P))$; where:

$$ED(P) \stackrel{def}{=} \sum_{k=1}^{N} (SortedD(k, P) * MAXD^{N-k})$$

The value ED is the contribution from the maximum distance matching, and the value MAXD is the maximum distance on the display screen (typically the diagonal distance). The layered maximum distance matching in this example accounts for the degeneracy of the configuration once the components with larger distances have been matched.

Figure 10:
FIG. 10 illustrates an example of crossing trajectories that may indicate unwanted component associations in accordance with one or more embodiments.

FIG. 10 illustrates an example 1000 of crossing trajectories that may indicate unwanted associations between components 1002 in a current frame and components 1004 from a previous frame. A min-max distance determination may incorrectly associate a current component to a previous component. A value EC(P) is defined as being proportional to the number of crossings in trajectory for all pairs of labels in the mapping P, and at a sampling rate of approximately 100 Hz, a crossing can be regarded as spurious mapping. In this example, the matching of component A to component C, and component B to component D is preferred over the crossing trajectories of components A to D and B to C. However, without EC(P), a pure ED(p) would likely incorrectly associate the crossing trajectories of components A to D and B to C, which is clearly undesired.

Figure 11:
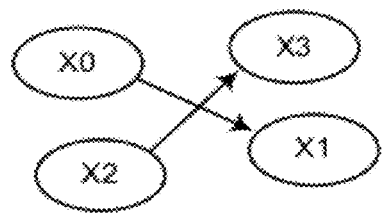
FIG. 11 illustrates an example of how to compute and account for crossing trajectories as shown in FIG. 10 in accordance with one or more embodiments.

FIG. 11 illustrates an example 1100 of how to compute and account for crossing trajectories, such as shown in FIG. 10. A computation of EC considers that for the pair of trajectories $\overline{x_0 x_1}$ and $\overline{x_2 x_3}$, the condition where they cross each other is when the following inequalities hold true simultaneously:

$$0 < (b_1 * c_0 - b_0 * c_1)/\det < 1$$

$$0 < (a_0 * c_1 - a_1 * c_0)/\det < 1$$

$$(\det = b_1 * a_0 - b_0 * a_1); \text{ where}$$

$$a = (a_0, a_1) = x_1 - x_0$$

$$b = (b_0, b_1) = x_2 - x_3$$

$$c = (c_0, c_1) = x_2 - x_0$$

Figure 12:
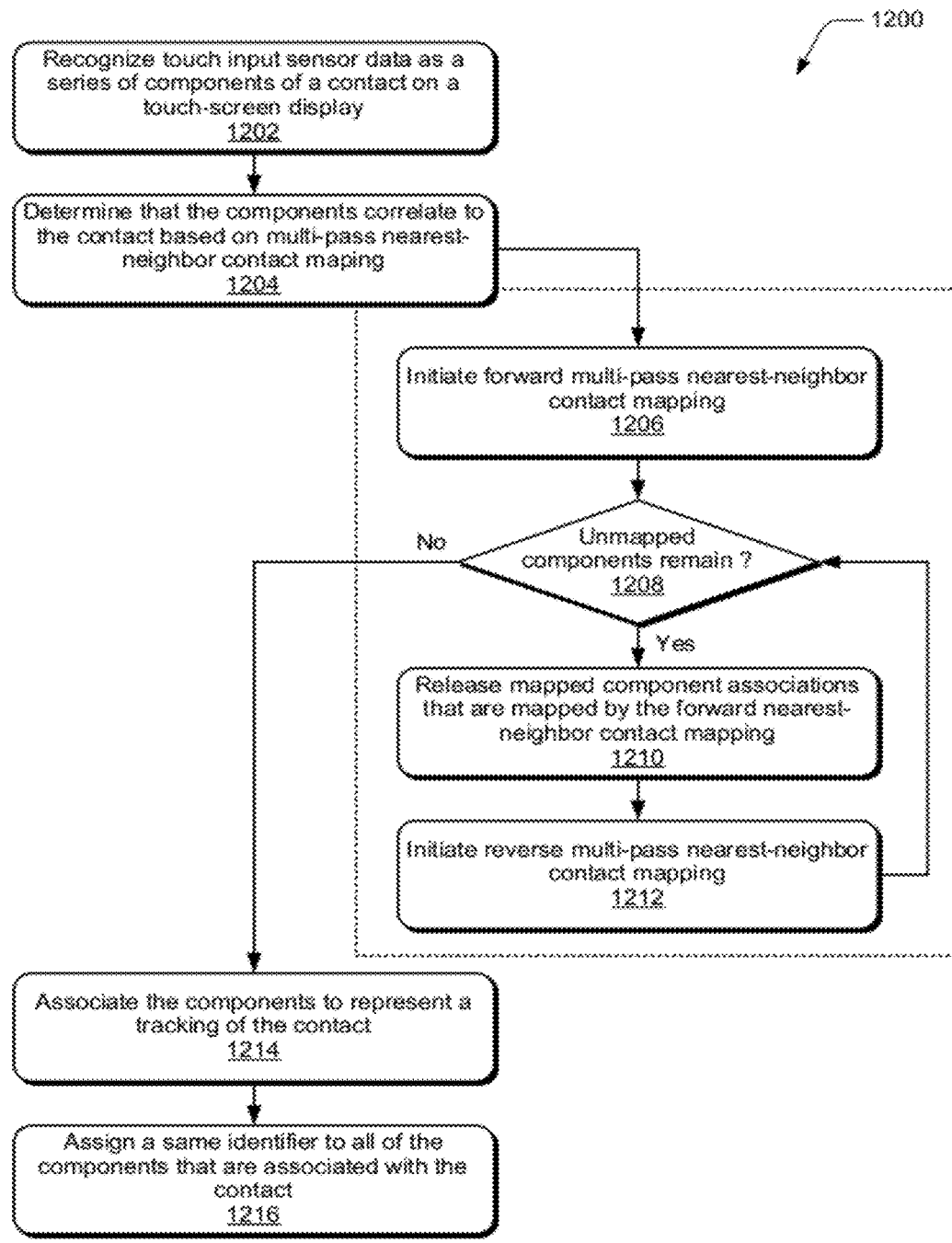
FIG. 12 illustrates example method(s) of multi-pass touch contact tracking in accordance with one or more embodiments.

FIG. 12 illustrates example method(s) 1200 of multi-pass touch contact tracking. The order in which the method blocks are described are not intended to be construed as a limitation, and any number of the described method blocks can be combined in any order to implement a method, or an alternate method.

At block 1202, touch input sensor data is recognized as a series of components of a contact on a touch-screen display. For example, the touch input module 114 (FIG. 1) at the computing device 102 recognizes the touch input sensor data 116 as the series of components of a contact (e.g., either of the two contacts 122, 124) of the gesture input 112 on the touch-screen display 110, such as on the example device 104.

At block 1204, the components are determined as correlating to the contact based on multi-pass nearest-neighbor contact mapping. For example, the contact tracking service 142 (FIG. 1) at the computing device 102 determines that the components of the contact 122 correlate to the contact based on multi-pass nearest-neighbor contact mapping that includes forward nearest-neighbor contact mapping of the components and reverse nearest-neighbor contact mapping of the components.

At block 1206, the forward nearest-neighbor contact mapping is initiated. For example, the contact tracking service 142 initiates the forward nearest-neighbor contact mapping to evaluate distance from one or more additional components of the contact to predicted component positions of the components. At block 1208, a determination is made as to whether any unmapped components remain after the forward nearest-neighbor contact mapping. If unmapped components remain (i.e., "yes" from block 1208), then at block 1210, mapped component associations that are mapped by the forward nearest-neighbor contact mapping are released and, at block 1212, the reverse nearest-neighbor contact mapping is initiated. For example, the contact tracking service 142 determines whether unmapped components remain after the forward nearest-neighbor contact mapping and, if yes, releases any mapped component associations and initiates the reverse nearest-neighbor contact mapping to evaluate distance from the predicted component positions to the one or more additional components of the contact.

At block 1214, the components of the contact are associated to represent a tracking of the contact and, at block 1216, a same identifier is then assigned to all of the components that are associated with the contact. For example, the contact tracking service 142 associates all of the components of the contact to represent a tracking of the contact and assigns the same identifier to all of the components.

Figure 13:
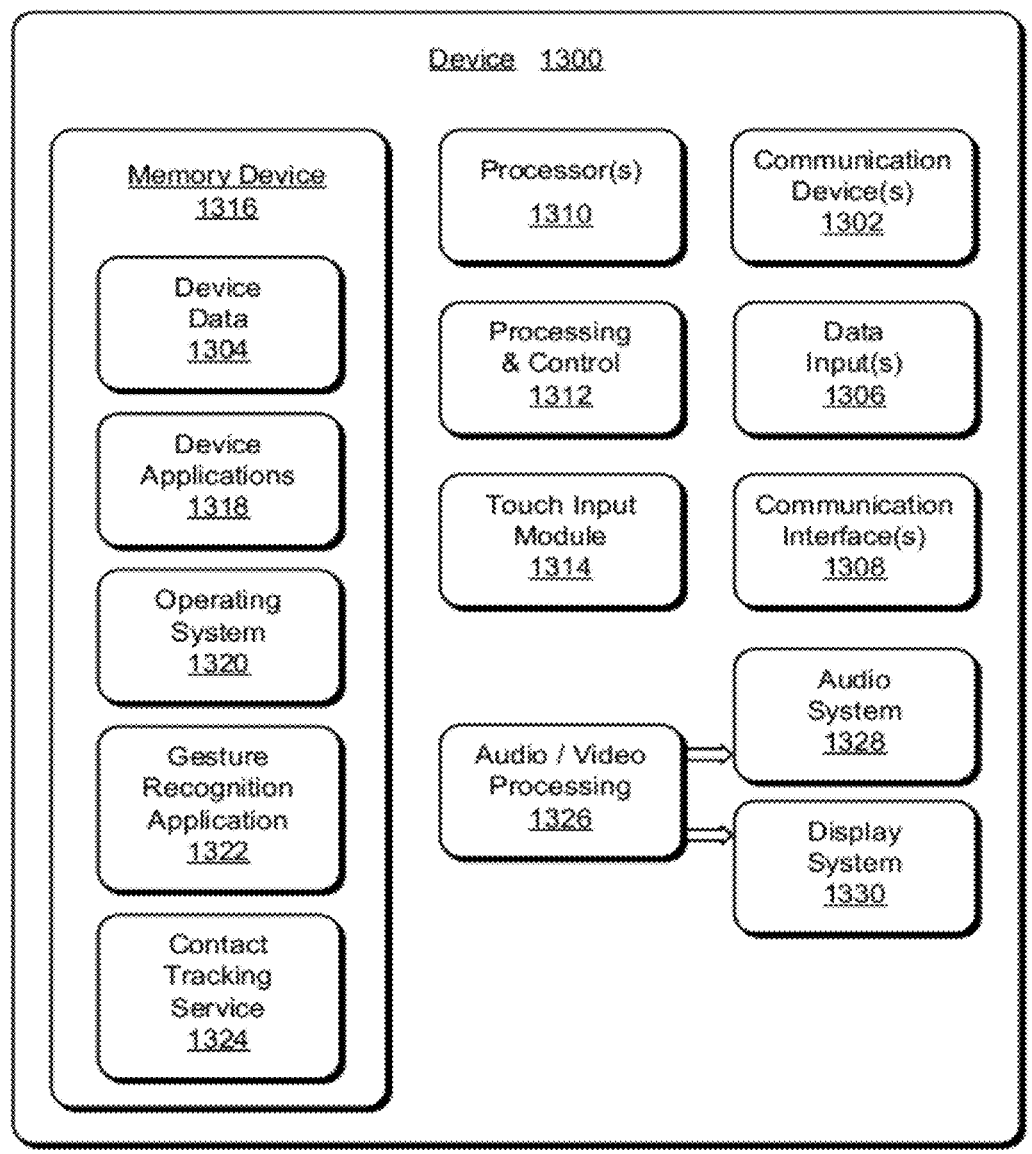
FIG. 13 illustrates various components of an example device that can implement embodiments of multi-pass touch contact tracking.

FIG. 13 illustrates various components of an example device 1300 that can be implemented as any of the devices, or services implemented by devices, described with reference to the previous FIGS. 1-12. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 1300 includes communication devices 1302 that enable wired and/or wireless communication of device data 1304, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 1306 via which any type of data, media content, and/or inputs can be received, such as user-selectable inputs and any other type of audio, video, and/or image data received from any content and/or data source.

The device 1300 also includes communication interfaces 1308, such as any one or more of a serial, parallel, network, or wireless interface. The communication interfaces provide a connection and/or communication links between the device and a communication network by which other electronic, computing, and communication devices communicate data with the device.

The device 1300 includes one or more processors 1310 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 1312. In embodiments, the device 1300 can also include a touch input module 1314 that is implemented to recognize touch input sensor data. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 1300 also includes one or more memory devices 1316 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 1316 provides data storage mechanisms to store the device data 1304, other types of information and/or data, and various device applications 1318. For example, an operating system 1320 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 1318 include a gesture recognition application 1322 and a contact tracking service 1324 that implement embodiments of angular contact geometry as described herein.

The device 1300 also includes an audio and/or video processing system 1326 that generates audio data for an audio system 1328 and/or generates display data for a display system 1330. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of multi-pass touch contact tracking have been described in language specific to features and/or methods, the subject of the appended claims is not necessarily limited to the specific features or methods described. Rather, the specific features and methods are disclosed as example implementations of multi-pass touch contact tracking.

The invention claimed is:

1. A method, comprising:
    recognizing touch input sensor data as a series of components of a contact on a touch-screen display;
    determining that the components correlate to the contact based on multi-pass nearest-neighbor contact mapping that includes forward nearest-neighbor contact mapping of the components and reverse nearest-neighbor contact mapping of the components; and
    associating the components to represent a tracking of the contact.

2. A method as recited in claim 1, wherein the forward nearest-neighbor contact mapping evaluates distance from one or more additional components of the contact to predicted component positions of the components.

3. A method as recited in claim 2, wherein the reverse nearest-neighbor contact mapping evaluates distance from the predicted component positions to the one or more additional components of the contact.

4. A method as recited in claim 1, wherein the reverse nearest-neighbor contact mapping is initiated when unmapped components remain after the forward nearest-neighbor contact mapping.

5. A method as recited in claim 4, wherein mapped component associations that are mapped by the forward nearest-neighbor contact mapping are released when the reverse nearest-neighbor contact mapping is initiated.

6. A method as recited in claim 1, further comprising:
    assigning a same identifier to the components that correlate to the contact;
    determining that subsequent components correlate to the contact based on the multi-pass nearest-neighbor contact mapping; and
    assigning the same identifier to the subsequent components that combine with the components to represent the tracking of the contact.

7. A method as recited in claim 1, further comprising:
    predicting a component position of the contact from the tracking of the contact; and
    correlating the predicted component position to a subsequent component of the contact.

8. A method as recited in claim 7, wherein the predicted component position is predicted based on the components that represent the tracking of the contact.

9. A computing device, comprising:
    a touch-screen display;
    a touch input module configured to recognize touch input sensor data as a series of components of a contact on the touch-screen display;
    at least a memory and a processor to implement a contact tracking service configured to:
        determine that the components correlate to the contact based on multi-pass nearest-neighbor contact mapping that includes forward nearest-neighbor contact mapping of the components and reverse nearest-neighbor contact mapping of the components; and
        associate the components to represent a tracking of the contact.

10. A computing device as recited in claim 9, wherein the forward nearest-neighbor contact mapping evaluates distance from one or more additional components of the contact to predicted component positions of the components.

11. A computing device as recited in claim 10, wherein the reverse nearest-neighbor contact mapping evaluates distance from the predicted component positions to the one or more additional components of the contact.

12. A computing device as recited in claim 9, wherein the reverse nearest-neighbor contact mapping is initiated when unmapped components remain after the forward nearest-neighbor contact mapping.

13. A computing device as recited in claim 12, wherein mapped component associations that are mapped by the forward nearest-neighbor contact mapping are released when the reverse nearest-neighbor contact mapping is initiated.

14. A computing device as recited in claim 8, wherein the contact tracking service is further configured to:
assign a same identifier to the components that correlate to the contact;
determine that subsequent components correlate to the contact based on the multi-pass nearest-neighbor contact mapping; and
assign the same identifier to the subsequent component that represent the tracking of the contact.

15. A computing device as recited in claim 9, wherein the contact tracking service is further configured to:
predict a component position of the contact from the tracking of the contact; and
correlate the predicted component position to a subsequent component of the contact.

16. A computing device as recited in claim 15, wherein the contact tracking service is further configured to predict the component position based on the components that represent the tracking of the contact.

17. A method, comprising:
recognizing touch input sensor data as a series of components of one or more contacts on a touch-screen display;
initiating a forward nearest-neighbor contact mapping to determine the components that correlate to the respective one or more contacts;
determining that unmapped components remain after the forward nearest-neighbor contact mapping, the unmapped components based on two touch positions having the same [x,y] grid point coordinates; and
initiating a reverse nearest-neighbor contact mapping to determine the components that correlate to the respective one or more contacts.

18. A method as recited in claim 17, further comprising:
releasing mapped component associations that are mapped by the forward nearest-neighbor contact mapping when said initiating the reverse nearest-neighbor contact mapping, the reverse nearest-neighbor contact mapping correlating the released unmapped components to the respective one or more contacts.

19. A method as recited in claim 1, wherein said associating the components is based on a two-level procedure, comprising:
establishing an initial association of the components of the contact for gesture input tracking based on prediction; and
validating the initial association of the components of the contact based on the nearest-neighbor contact mapping criteria generating a final association of the components of the contact.

20. A computing device as recited in claim 9, wherein to associate the components is based on a two-level procedure that is configured to:
establish an initial association of the components of the contact for gesture input tracking based on prediction; and
validate the initial association of the components of the contact based on the nearest-neighbor contact mapping criteria generating a final association of the components of the contact.

* * * * *